United States Patent

Takano

Patent Number: 5,611,306
Date of Patent: Mar. 18, 1997

[54] INTERNAL COMBUSTION ENGINE VALVE

[75] Inventor: Yuji Takano, Chigasaki, Japan

[73] Assignee: Fuji Oozx Inc., Fujisawa, Japan

[21] Appl. No.: 512,392

[22] Filed: Aug. 8, 1995

[51] Int. Cl.$^6$ .................................................. F01L 3/04
[52] U.S. Cl. ..................................... 123/188.3; 123/188.8
[58] Field of Search ............................... 123/188.3, 188.8

[56] References Cited

U.S. PATENT DOCUMENTS

| | | |
|---|---|---|
| 4,117,302 | 9/1978 | Earle et al. |
| 4,122,817 | 10/1978 | Matlock |
| 4,300,474 | 11/1981 | Livsey |
| 5,431,136 | 7/1995 | Kenmoku et al. ............ 123/188.8 |

FOREIGN PATENT DOCUMENTS

| | | |
|---|---|---|
| 61-276774 | 12/1986 | Japan |
| 61-296979 | 12/1986 | Japan |
| 62-57770 | 3/1987 | Japan |
| 2-92494 | 4/1990 | Japan |

Primary Examiner—Erick R. Solis
Attorney, Agent, or Firm—Hoffman, Wasson & Gitler

[57] ABSTRACT

There is provided an internal combustion engine valve having a body, a head, and a contact surface disposed on a head surface to be adapted to periodically enter into gas-sealing engagement with a valve seat, said contact surface being formed in alloy deposit welded to said valve head, by a high density energy beam such as a plasma beam or a laser beam, on said head surface, a cobalt based composition of said alloy deposit, measured at said contact surface, consisting essentially of
carbon: 2.2 to 2.6 weight percent;
silicon: 1.1 to 1.3 weight percent;
manganese: 2.6 to 3.1 weight percent;
nickel: not more than 1.5 weight percent;
chromium: 28 to 31 weight percent;
iron: 10 to 11 weight percent;
tungsten: 13.5 to 15.5 weight percent;
balancing cobalt and inevitable amount of impurities.

7 Claims, 2 Drawing Sheets

INTERNAL COMBUSTION ENGINE VALVE

FIELD OF THE INVENTION

The present invention relates to an internal combustion engine valve provided with a hard facing surface produced by weld-applying a specific composition alloy on an original facing surface of a valve head by using a high density energy beam such as a plasma beam, and a laser beam. The resulting hard-facing surface of a valve head of the present invention will exhibit good wear properties, high resistance to PbO corrosion, and high oxidation resistance in a relatively low cost composition.

DESCRIPTION OF THE PRIOR ART

In the prior art, super heat resistant alloy compositions to be adapted to form a abrasion resistant coating, such as Co-based alloy, Ni-based alloy or Fe-based alloy have been used for preparation of the contact surface of engine valves by oxyacetylene welding process, or plasma powder torch welding process, or laser powder welding process, so as to form an abrasion resistant coated surface.

A conventionally used hard-facing alloy for exhaust valve facing are the Stellite alloy, which are cobalt-chromium facing alloys commonly used in applications where an unfaced austenitic stainless steel valve is otherwise subject to severe face wear and corrosion. The various Stellite alloys including Cobalt based alloy of STL #6 (refer to JIS; 1.2C-1.0Si-30Cr-4W-Co:balance ), STL #32 (1.8C-1.0Si-22Ni-26Cr-12W-Co: balance) possesses excellent high temperature wear resistance, resistance to PbO corrosion and oxidation resistance. However, the Stellite alloys are expensive materials due to their high content of expensive metals such as cobalt, nickel and tungsten. The basic Stellite composition is a non-ferrous alloy of 40 to 80% cobalt, 0 to 25% tungsten, 20 to 35% chromium and 0.75 to 2.5% carbon.

Where cobalt based alloy is used for preparation of the contact surface of valves by oxyacetylene welding process, the prepared facing will entail high possibility of defects found in the contact surface.

There are known the use of a laser beam in place of oxyacetylene for welding a hard coating on the facing of a valve, e.g. see U.S. Pat. Nos. 4,117,302 and 4,300,474.

Japanese (Unexamined) Patent Laid-open application No. 61-296979/1986 suggests incorporation of parent alloy into a hard facing alloy in the amount of less than 1.2 wt %, at the depth of 0.1 mm when a laser beam is used. Further, Japanese (Unexamined) Patent Laid-open application No. 62-57770 suggests the control of dilution of the coating alloy by the parent alloy, by adjusting the feed of plasma gas. Japanese (Unexamined) Patent Laid-open application No. 61-276774 proposes a coating of nickel super alloy with addition of steel component in the amount of 3.0 to 8.0 wt %, on the facing of a valve by using a high energy density source such as a laser beam U.S. Pat. No. 4,122,817 discloses an engine valve having a contact surface of formed of an alloy which exhibits wear-resistant properties, PbO corrosion resistance and oxidation resistance, and the alloy containing carbon 1.4 to 2.0 wt. %, molybdenum 4.0 to 6.0 wt. %, silicon 0.1 to 1.0 wt. %, nickel 8 to 13 wt. %, chromium 20 to 26 wt. %, manganese 0 to 3.0 wt. % with balance being iron.

Japanese (Unexamined) Patent Laid-open application No. 2-243042/1980 proposed an iron-based alloy composition in use for a material to be coated on a face of an engine valve, which comprises C; 1.0 to 2.5 wt. %, Si; 0.1 to 1.0 wt. %, Mn; 3 to 12 wt. % Ni; 15 to 25 wt. %, Cr; 20 to 30 wt. %, Mo; 5 to 15 wt. %, B; 0.005 to 0.05 wt. %, Al; 0.01 to 0.1 wt. % and 0; 0.01 to 0.05 wt. % with balance being Fe and impurities. In this alloy composition, the addition of relatively uncostly manganese will provide corrosion resistance at desired level, and at the same time, the addition of boron will ensure somehow fluidity at high temperature, and the addition of aluminum will provide homogeneity in the microstructure of the alloy.

As will be demonstrated, valve facings formed with cobalt based alloys in accordance with the present invention compare very favorably with facings formed from a Stellite alloy.

This is a remarkable accomplishment when it is realized that this high level of performance is achieved at a substantial cost saving when compared with the Stellite alloy.

SUMMARY OF THE INVENTION

It is an object of the present invention to provide valve facings formed with a specific cobalt based alloy composition in accordance with the present invention, adapted to form a hard facing surface by welding on a head surface comprising super heat resistant alloy or nickel-chromium super heat resistant alloy such as Inconel 751.

It is other object of the present invention to provide a method of manufacturing a hard-facing surface on a valve head by weld-applying a specific alloy composition on an original facing surface of the parent heat resistant alloy by using a high density energy beam such as a plasma beam and a laser beam.

The resulting hard-facing surface manufactured in accordance with the present invention will have a highly competitive performance to that of the prior art Stellite alloy surface.

The method of the present invention may enable high homogeneity in the resulting hard-facing surface of the valve head.

It is another object of the present invention to provide a hard-facing surface adhered strongly to the original surface of the head without any deterioration of performances.

The further object of the present invention will be understood from the below description.

A more detailed description of the invention is facilitated by reference to the drawings which form a part of this specification and wherein:

DETAILED DESCRIPTION OF PREFERRED EMBODIMENTS

Figure 1:
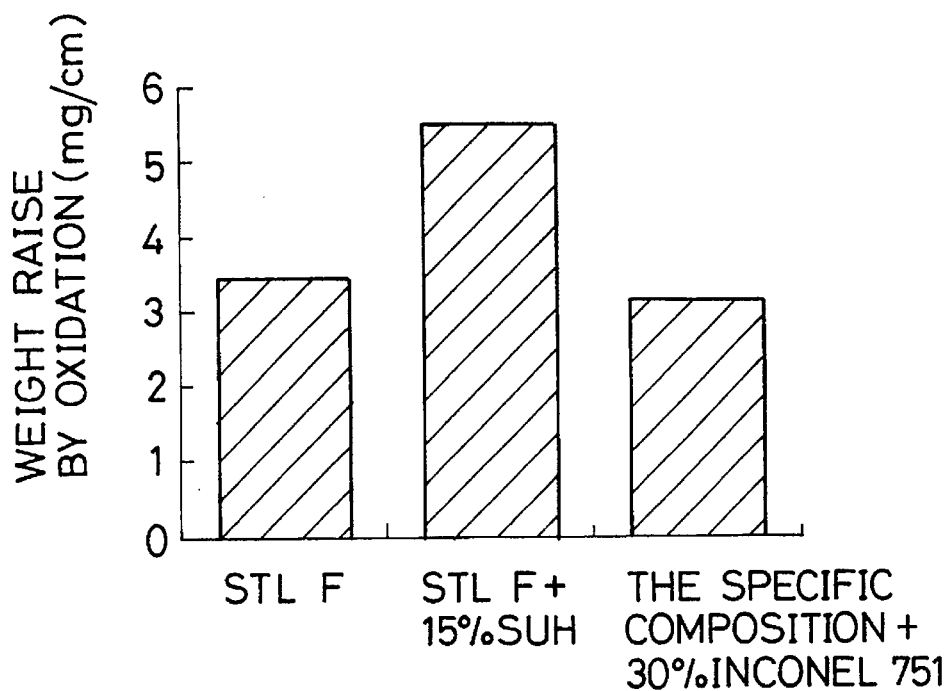
FIG. 1 is a graph comparing the performance, e.g. oxidation weight increase, of the valve hard-facing head surface formed in accordance with the present invention, with the other surface of the prior art alloy.

There is provided an internal combustion engine valve having a body, a head, and a contact surface disposed on a head surface comprising a nickel-chromium super heat resistant alloy, to be adapted to periodically enter into gas-sealing engagement with a valve seat, wherein said contact surface is formed by welding a cobalt based alloy, on the parent alloy of the head surface, using a high-density energy beam such as a plasma beam or a laser beam.

The welding strength between the parent alloy surface and the welded coat surface should be enough high by dispersing enough the ingredients of the parent alloy into the welded coat surface. Therefore, the contents in the welded coat will be diluted by the ingredients in the parent alloy so that the contents in the welded coat will be changed so as to cause possibility of degradation. Then, the dilution of the welded coat with the ingredients in the parent alloy during welding procedure should be controlled in the provision that the welding strength should be maintained at a certain level, and the coat performance should not be degraded.

Use of a high density energy beam such as a plasma beam and a laser beam may control the dilution of the coat layer as formed, with the ingredients in the parent alloy at a certain level. The dilution should be controlled within 10 to 20%, during welding procedure. When the dilution is up to 10%, the welding strength is not enough so that there will be a risk of "no adhesion" caused by internal defects within the resulting coat layer. When the dilution exceeds 20%, the performances of the coat layer will be significantly reduced, or affected by higher dilution.

A high density energy beam such as a plasma beam or a laser beam is applied to weld a specific alloy material on the surface of a valve head so as to form the hard-facing surface in which the ingredients in the parent alloy will be enough distributed or admixed into the welded coat, layer, by the high energy of the plasma beam and the like. The resulting coat layer will become homogeneous and then can have enough adhesion to the parent alloy surface.

An internal combustion engine valve having a body, a head, and a contact surface disposed on a head surface to be adapted to periodically enter into gas-sealing engagement with a valve seat, the contact surface being formed in alloy deposit welded to said valve head, by a high density energy beam such as a plasma beam or a laser beam, on said head surface, wherein the cobalt based composition of the alloy deposit, consists essentially of
carbon: 2.2 to 2.6 weight percent;
silicon: 1.1 to 1.3 weight percent;
manganese: 2.6 to 3.1 weight percent;
nickel: not more than 1.5 weight percent;
chromium: 28 to 31 weight percent;
iron: 10 to 11 weight percent;
tungsten: 13.5 to 15.5 weight percent;
balancing cobalt and inevitable amount of impurities.

The resulting dilution of the cobalt based alloy into the head surface at welding formation is adjusted to be 25 to 35 weight percent so as to improve the abrasion resistance of the contact surface. The parent heat resistant nickel-chromium alloy may be Inconel 751.

The aspect of the present invention resides in that the hard-facing contact surface of a valve head can be manufactured by welding procedure using a high density energy beam such as a plasma beam and a laser beam. Such manufacture can be attained by using a specific alloy composition to be welded on the original surface of the valve head, under consideration of the following points.

1. The composition and ingredients of the composition of the coat alloy to be used as welded on the original surface of a valve head are selected so that the dilution of the welded alloy with the parent alloy can be adjusted.

2. The resulting surface as welded should be homogeneous by agitation during welding procedure between the welding coat and the original surface, so that there is no degradation of heat resistance.

The super heat resistant alloy, particularly made of Ni-Cr super heat resistant alloy has been used as a material of original surface of the valve head of an internal combustion engine. The alloy composition of the present invention is applied on such Ni-Cr alloy surface (parent alloy) to form a mutually diluted surface (coat) layer with high corrosion resistance.

Valve blanks employed in the practice of the present invention can be formed of a variety of conventional alloys.

Similarly, the composition and proportion of ingredients in the alloy or other primary source of the original surface alloy composition can vary over reasonably wide limits.

A specific composition alloy of the present invention to be welded or coated is applied on the original facing surface of a valve head comprising Ni-Cr series super heat resistant alloy. Such Ni-Cr series super heat resistant alloy may include Inconel alloy, preferably Inconel 751, and further, a Monel metal alloy and a Hateroy alloy can be used as an original facing surface.

The composition of Inconel 751 alloy is as follows;

TABLE 1

| | metal | | | | | | | | |
|---|---|---|---|---|---|---|---|---|---|
| | C | Si | Mn | Ni | Cr | Al | Ti | Nb, Ta | Fe |
| weight percent | 0.05 | 0.2 | 0.2 | 71.0 | 16.0 | 1.2 | 2.5 | 1.0 | 7.85 |

What is critically important is that the weld alloy deposited on the valve head particularly made of Inconel 751 (the parent alloy), or the alloy composition to be used for formation of a hard-facing contact surface of an engine valve, on the surface of a valve head, in accordance with the present invention, contains the following ingredients in the proportion below: a cobalt based composition of said alloy deposit, consisting essentially of
carbon: 2.2 to 2.6 weight percent;
silicon: 1.1 to 1.3 weight percent;
manganese: 2.6 to 3.1 weight percent;
nickel: not more than 1.5 weight percent;
chromium: 28 to 31 weight percent;
iron: 10 to 11 weight percent;
tungsten: 13.5 to 15.5 weight percent;
balancing cobalt and inevitable amount of impurities.

The reasons for the limitation of each ingredient in the alloy composition in use for the formation of the contact surface of engine valves against the facing of the above-mentioned specific heat resistant alloy composition in accordance with the present invention are as follows:

Carbon is added so as to ensure hardness and abrasion resistance of the formed contact surface at the desired level. When the content of carbon is up to 2.2% by weight, the hardness and the abrasion resistance of the welding-formed contact surface cannot be afforded at desired levels. Further, when the content of carbon exceed 2.6% by weight, the hardness of the formed contact surface will be excessive and the toughness will be reduced. Then, more preferable range of carbon content is 2.2% by weight to 2.6% by weight.

Silicon is added so as to effect reduction of acid and melt-flowability of the alloy at time of welding procedure. When the content of silicon is up to 1.1% by weight, the de-acidation effect is not enough so to form defect such as pin-hole in the formed contact surface. When the content of silicon exceeds 1.3% by weight, the melt flowability will not raise more, and further the resistance to $PbO+PbSO_4$ will be reduced.

Nickel is added so as to improve a PbO resistance and a $PbO+PbSO_4$ resistance of the formed contact surface. When the content of nickel is up to 0.1 by weight, the corrosion resistance is not enough. When the content of nickel exceeds 1.3% by weight, the high cost of nickel will raise the preparation cost.

Chromium is added so as to contribute the raise of corrosion resistance particularly acid resistance. When the content of chromium is up to 28.0% by weight, the acid resistance cannot be afforded at the desired sufficient level. Further, when the content of chromium exceeds 31.0% by weight, the heat shock resistance will be reduced so that the risk of formation of defects such as occurrence of crack after welding procedure will be raised during manufacture of the valve.

Iron is added so as to contribute to raise heat shock resistance of the formed contact surface. When iron is up to 10.0% by weight, the heat shock resistance is not enough. When the content of iron exceeds 11% by weight, the hardness at the higher temperature will be reduced and the abrasion resistance is reduced.

Tungsten is added so as to establish the hardness of the contact surface and the high temperature strength thereof at the desired levels, by forming very finely divided particles of carbide. When the content of tungsten is up to 13.5% by weight, both of the hardness and strength at a higher temperature are not enough. When the content of tungsten exceeds 15.5% by weight, both of the welding solubility and the workability of the contact surface will be reduced.

The hard-facing contact surface in accordance with the present invention may be formed by the known high density energy beam including plasma beam and laser beam, using inert gas shielded welding. The specific alloy composition of the present invention will be diluted by the parent alloy, i.e. nickel-chromium super heat resistant alloy, so as to shift the composition of the hard-facing surface but no degradation of the performance of the surface of the valve head.

Such welding processes may conveniently be automated to proved a high rate of production of hard-faced engine valves.

The prior art alloy to be used for welding on the contact surface is an alloy composition corresponding to Stellite alloy which is a Co-Cr-W series alloy available from Hayes Stellite, U.S.A., and has a higher hardness, and higher abrasion resistance and acid resistance, and further can not degrade its performance even at a red-hot (incandescent) temperature.

The Stellite alloy has been used for an abrasion resistant portion of an internal combustion engine. The resulting composition of the hard-facing surface manufactured by welding the specific alloy composition on the original surface by using a high density energy beam, in accordance with the present invention is similar to that of such Stellite alloy. Therefore, it can be understood that the hard-facing surface alloy of the present invention has a competitive performances such as abrasion resistance and oxidation resistance.

It will be appreciated by those skilled in the art that the hard-facing contact surface formed in accordance with the present invention comprises the desired proportions of metallurgical ingredients by interplaying valve blank metallurgy, weld wire metallurgy, and welding conditions.

Thus, increasing the energy supplied during welding, will increase by dilution the metallurgical contribution to the weld metal of ingredients contained in the original valve head. Conversely, decreasing the energy supplied during welding will decrease the contribution made by the valve head and a compensating adjustment may have to be made in the composition of the weld wire or other primary source of weld metal to provide a contact surface having the desired composition.

The hard-facing surface produced in accordance with the present invention can be further explained on the basis of Comparative example.

Comparative Example

The specific composition to be used for welding in accordance with the present invention is applied on the original facing surface made of Nickel-Chromium super heat resistant alloy, e.g. Inconel 751, so as to melt together thereby forming a highly abrasion resistant facing surface, by using high density energy beam such as a plasma beam and a laser beam. The resulting composition of the weld-applied facing surface of the valve head will can be estimated as follows:

The content of ingredient in the resulting surface can approach to=(1−the dilution/100)×(content in the specific composition)+the dilution/100×(content in the original surface alloy).

A powder alloy of Stellite F (hereinafter refer to as "STL F") is weld-applied on the facing surface of an engine valve comprising Austenite series SUH 36 by using a high energy beam such as a plasma beam or a laser beam, so as to form a coat surface having the composition in which Stellite F is 15% diluted with SUH 36. The resulting composition of the welded surface is estimated as shown in Table 2. Table 2 shows the composition of SUH 36 (at the second column), the 15% dilution of SUH 36 (at the third column), the composition of STL F (at the fourth column), the 85% dilution of STL F (at the sixth column) and the composition of the resulting welded facing surface (at the seventh column). Therefore, this combination of SUH 36 (the parent alloy) and STL F (the composition to be adapted to form a hard-facing contact surface) will exhibit enough competitive performances so that it will be practically utilized in view of the resulting composition.

TABLE 2

| ingre-dient | facing alloy | | cobalt based alloy | | composition formed (*1 + *2) |
|---|---|---|---|---|---|
| | SUH | SUH 36 × 0.15*¹ | Stellite | Stellite × 0.85*² | |
| C | 0.5 | 0.075 | 1.9 | 1.6115 | 1.69 |
| Si | 0.2 | 0.030 | 1.0 | 0.850 | 0.88 |
| Mn | 9.0 | 1.350 | 0.4 | 0.723 | 2.073 |
| Ni | 4.0 | 0.600 | 22.0 | 18.700 | 19.300 |
| Cr | 21.0 | 3.150 | 26.0 | 22.100 | 25.250 |
| W | — | | 12.0 | 10.200 | 10.200 |
| Fe | (65.3) | 9.795 | | | 9.795 |
| Co | — | | balance | | balance |

The composition of the weld-formed surface alloy produced in accordance with the present invention is as shown in the sixth column of Table 2. The formed surface alloys are tested for measuring respectively a Vicker's hardness( with loading of 5 kg). They are exposed to atmospheric oxidation test for 100 hours at the temperature of 1000° C., and then, the weight increases by oxidation are measured on each of Stellite F alloy (most right column in the graph of FIG. 1), the composition alloy of 15% diluted SUH 36 alloy by Stellite F (the center column in the graph of FIG. 1), and the composition formed in accordance with the present invention (30% diluted Inconel alloy) (most left column in the graph of FIG. 1).

Figure 2:
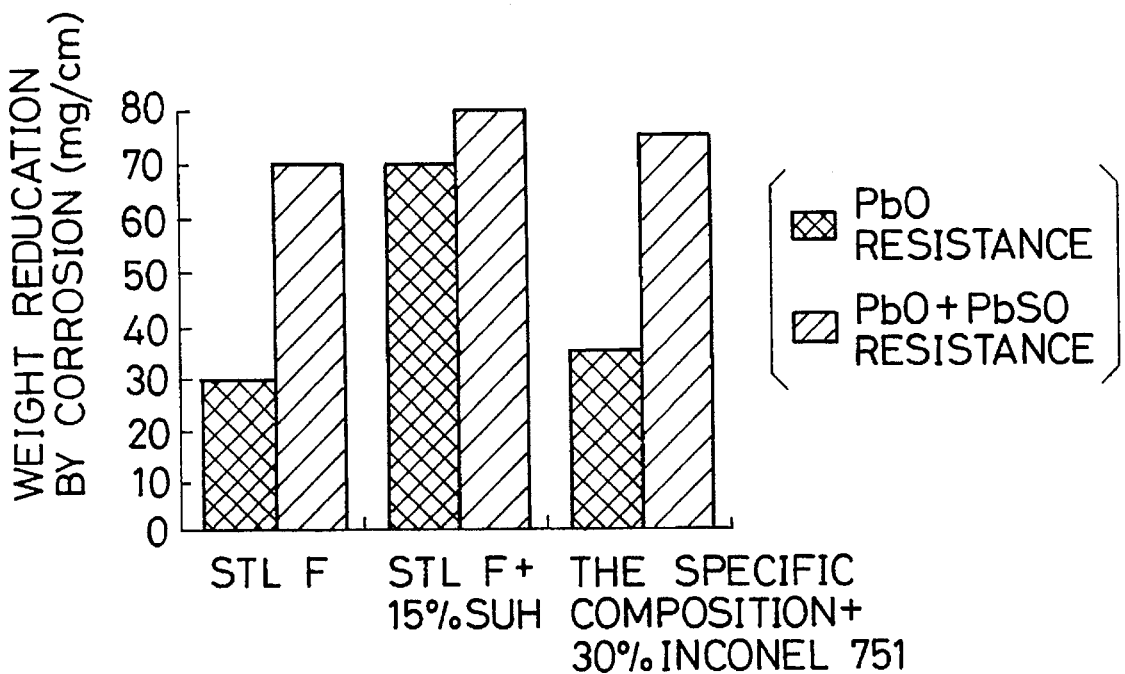
FIG. 2 is a graph showing corrosion weight reduction of the contact hard-facing surface being formed by the present invention, in comparison with the result from the prior art facing alloy.

The resistances against PbO and PbO+PDSO₄ are measured on the above-mentioned three species of the surface alloys. The test pieces respectively of the above surface alloys are tested on exposures to PbO for one hour at the temperature of 920° C., and on exposures to PbO+PbSO₄ for one hour at the temperature of 900° C. The size of the test pieces is 5 mm in diameter and 20 in length. The results of the tests are shown in FIG. 2.

Figure 3:
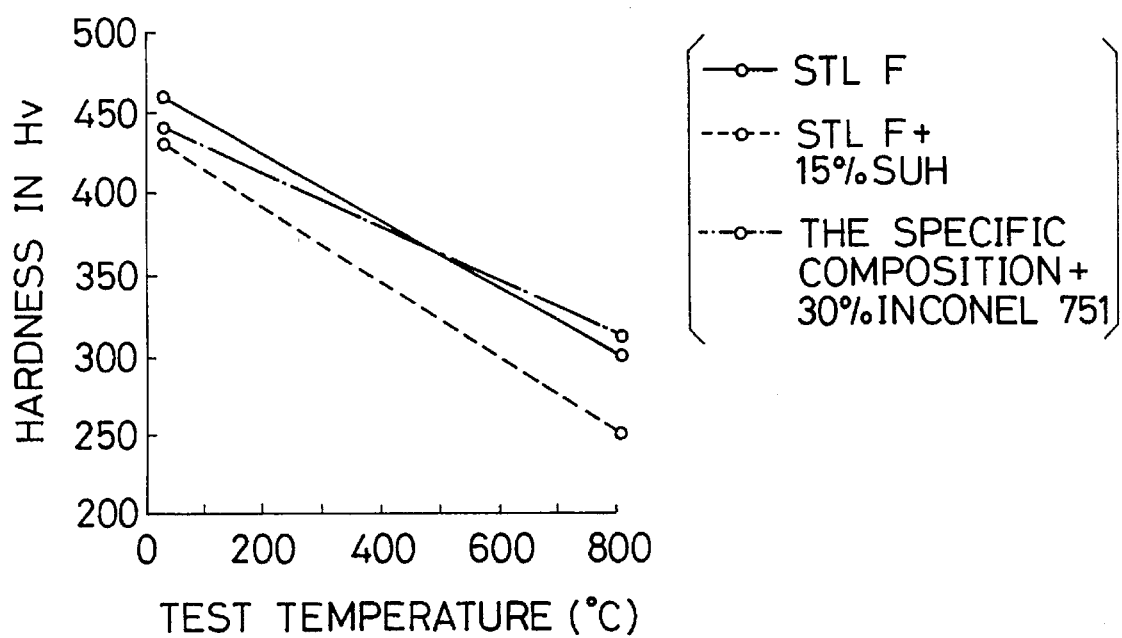
FIG. 3 is a graph showing the hardness change of the hard-facing surface being formed by the present invention, when the test temperature is raised, in comparison with the result from the prior art facing alloy.

Vicker's hardness is measured at ambient temperature and high temperature of 800° C. of the above-mentioned three species of surface alloys. The results are shown in FIG. 3. It is shown that when the measurement temperature is raised, the Vicker's hardness will decrease.

The present invention is further illustrated by the following example to show the formation of the valve facing alloy, in accordance with the present invention, but should not be interpreted for the limitation of the invention.

EXAMPLE

Valve Preparation

A valve having heads measuring 23.5 mm in diameter is made provided with a head surface formed from the alloy of Inconel 751. The cobalt based hard-facing alloys having the composition of the present invention, as shown in Table 3 was used to form a hard-facing contact surface by plasma-welding of the cobalt-based alloy on the surface of Inconel 751. The parent alloy 751 will be diluted by the cobalt based alloy in accordance with the present invention.

The parent alloy of the head surface will be diluted within the range of 25 to 35 weight percent in the formed hard-facing surface in accordance with the present invention. Therefore, the resulting compositions of the hard-facing surface are shown in Table 3.

The resulting compositions of the formed surface assuming with dilution of 25 percent and 35 percent are estimated and shown in the sixth column and the eighth column of Table 3. The original compositions of the welding alloy of the present invention are shown in the fifth column and the seventh column of Table 3. Therefore, it is understood that the resulting compositions seem to be equivalent to the 15% dilution of Stellite F as shown in Table 2.

It is clear from these test results that the valves provided with the resulting hard-facing surface formed in accordance with the present invention are fully comparable in terms of wear and oxidation resistance, to the prior art Stellite F facing surface. Further, during welding procedure, the alloy welded on the original surface will be diluted with the parent alloy of the surface, and at the same time, the original surface alloy would be diluted with the welded alloy, so that the adhesion between the welded surface and the original surface will be raised, and both are stably ensured. Further, the resulting alloy composition would be lighter than the prior art facing surface, to 10 to 20% weight difference. Then, it can be understood that the high density energy beam welding procedure can afford a competitive good facing surface for the valve head.

A plasma arc powder welding process was used in the preparation of the hard-facing contact surface of the engine valve, in accordance with the present invention, but other inert gas shield welding process such as laser powder welding method can be used so as to result in similar welding formation.

The alloy welded on the surface of a valve head can become homogeneous during welding procedure so as to dilute homogeneously the alloy with the surface alloy. The formed hard-facing surface of the present invention has homogeneously diluted coating with high adhesion with the surface of the head.

A high density energy beam such as plasma or laser beam can be used in the welding process for the preparation of the hard-facing contact surface of the engine valve, in an inert gas shield, so as to result in a hard-facing contact surface entailing highly competitive performance of an internal combustion engine.

Further, high hardness and high corrosion resistance of the contact surface as formed can be afforded in accordance with present invention.

I claim:

1. An internal combustion engine valve having a body, a head with a head surface, and a contact surface disposed on said head surface, said valve being constructed from a nickel-chromium super heat resistant alloy;

wherein said contact surface is diluted with a super heat resistant cobalt based alloy;

wherein a dilution of the cobalt based alloy into the head surface at welding formation is adjusted to be 25 to 35 weight percent.

TABLE 3

(in percent by weight)

| Ingredient | Original Surface Composition | | | Coat Alloy Composition | Formed: Dilution 75% | Coat Alloy Composition | Formed: Dilution 65% | Result Composition Range |
| --- | --- | --- | --- | --- | --- | --- | --- | --- |
| | Inconel 751 | Dilution 25% | Dilution 35% | | | | | |
| C | 0.05 | 0.013 | 0.018 | 2.236 | 1.690 | 2.572 | 1.690 | 2.2–2.6 |
| Si | 0.2 | 0.050 | 0.070 | 1.111 | 0.883 | 1.246 | 0.880 | 1.1–1.3 |
| Mn | 0.2 | 0.050 | 0.070 | 2.697 | 2.073 | 3.082 | 2.073 | 2.6–3.1 |
| Ni | 71.0 | 17.750 | 24.850 | 1.550 | 18.913 | | 24.850 | ≦1.5 |
| Cr | 16.0 | 4.000 | 5.600 | 28.333 | 25.250 | 30.231 | 25.250 | 28.0–31.0 |
| Al | 1.2 | 0.300 | 0.420 | | 0.300 | | 0.420 | |
| Ti | 2.5 | 0.625 | 0.875 | | 0.625 | | 0.875 | |
| Nb, Ta | 1.0 | 0.250 | 0.350 | | 0.250 | | 0.350 | |
| Fe | 8.0 | 2.000 | 2.800 | 10.393 | 9.795 | 10.762 | 9.795 | 10.0–11.0 |
| W | | | | 13.600 | 10.200 | 15.692 | 10.200 | 13.5–15.5 |
| Co | | | | | balance | | balance | |

2. The combustion engine valve as claimed in claim 1, wherein said super heat resistant nickel-chromium alloy comprises:
  Carbon: 0.05 weight percent;
  Silicone: 0.2 weight percent;
  Manganese: 0.2 weight percent;
  Nickel: 71.0 weight percent;
  Chromium: 16.0 weight percent;
  Aluminum: 1.2 weight percent;
  Titanium: 2.5 weight percent;
  Niobium: 1.0 weight percent; and
  Iron: 7.85 weight percent.

3. The combustion engine valve as claimed in claim 1, wherein said super heat resistant nickel-chromium alloy comprises:
  Nickel: not less than 70.00 weight percent;
  Chromium: 14.00 to 17.00 weight percent;
  Iron: 5.00 to 9.00 weight percent;
  Titanium: 2.00 to 2.60 weight percent;
  Niobium: 1.0 weight percent;
  Manganese: not more than 1.00 weight percent;
  Aluminum: 0.90 to 1.50 weight percent;
  Copper: not more than 0.50 weight percent;
  Silicone: not more than 0.50 weight percent;
  Phosphorus: not more than 0.030 weight percent;
  Sulphur: not more than 0.015 weight percent; and
  Carbon: not more than 0.10 weight percent.

4. An internal combustion engine valve having a body, a head with a head surface, and a contact surface disposed on said head surface, said contact surface having a composition consisting essentially of:
  Carbon: 2.2 to 2.6 weight percent;
  Silicone: 1.1 to 1.3 weight percent;
  Manganese: 2.6 to 3.1 weight percent;
  Nickel: not more than 1.5 weight percent;
  Chromium: 28 to 31 weight percent;
  Iron: 10 to 11 weight percent;
  Tungsten: 13.5 to 15.5 weight percent; and
  balancing cobalt and inevitable impurities.

5. The internal combustion engine valve as claimed in claim 4, wherein a dilution of the contact surface at welding formation is adjusted to be 25 to 35 weight percent.

6. (Twice Amended) The combustion engine valve as claimed in claim 4, wherein said valve is constructed from a super heat resistant nickel-chromium alloy which comprises:
  Carbon: 0.05 weight percent;
  Silicone: 0.2 weight percent;
  Manganese: 0.2 weight percent;
  Nickel: 71.0 weight percent;
  Chromium: 16.0 weight percent;
  Aluminum: 1.2 weight percent;
  Titanium: 2.5 weight percent;
  Niobium: 1.0 weight percent; and
  Iron: 7.85 weight percent.

7. The combustion engine valve as claimed in claim 4, wherein said valve is constructed from a super heat resistant nickel-chromium alloy which comprises:
  Nickel: not less than 70.00 weight percent;
  Chromium: 14.00 to 17.00 weight percent;
  Iron: 5.00 to 9.00 weight percent;
  Titanium: 2.00 to 2.60 weight percent;
  Niobium: 1.0 weight percent;
  Manganese: not more than 1.00 weight percent;
  Aluminum: 0.90 to 1.50 weight percent;
  Copper: not more than 0.50 weight percent;
  Silicone: not more than 0.50 weight percent;
  Phosphorus: not more than 0.030 weight percent;
  Sulphur:not more than 0.015 weight percent; and
  Carbon: not more than 0.10 weight percent.

* * * * *